June 30, 1970 SHIRO MATSUNO ET AL 3,518,126
DEFERRED ACTION BATTERY
Filed May 10, 1968

INVENTOR
Shiro Matsuno
Yoshio Kobayashi
BY
Watson, Cole, Grindle & Watson
ATTORNEY United States Patent Office 3,518,126
Patented June 30, 1970

3,518,126
DEFERRED ACTION BATTERY
Shiro Matsuno and Yoshio Kobayashi, Takatsuki, Japan, assignors to Yuasa Battery Company Limited, Hakubaicho, Takatsuki, Osaka Prefecture, Japan
Filed May 10, 1968, Ser. No. 728,122
Int. Cl. H01m 17/00
U.S. Cl. 136—100                                    2 Claims

ABSTRACT OF THE DISCLOSURE

This invention relates to a deferred action battery adapted for long-time discharge that comprises a cake of active mixture serving as a cathodic oxiding agent. The cake of active mixture is formed of powdered cupric sulfate bound together with synthetic resin and molded. Magnesium zinc and their alloys are used as an anodic reducing agent. Aqueous neutral salt solutions are used as an electrolyte.

---

This invention relates to a deferred action battery and more particularly to a cupric sulfate cell.

The Daniel cell is conventionally well known as a cell in which cupric sulfate is used as a cathodic oxidizing agent. And there is a cupric sulfate cell produced as an improvement over the Daniel cell, which cupric sulfate cell comprises cupric sulfate used as a cathodic oxidizing agent, magnesium or zinc as an anodic reducing agent, and water or sea water as an electrolyte. Cupric sulfate, used as a cathodic oxidizing agent, is molded by applying water and pressure to powdered cupric sulfate to form what is generally termed a cake of active mixture. The molded cupric sulfate is disintegrated during use because of the solvent action of the electrolyte, with the result that a conventional type of cupric sulfate cell of the construction described has high inner resistance and inferior performance. Especially when long-time discharge, namely discharge current density is a low current as for example 5 ma./cm.$^2$, the cell is considerably inferior in performance. This invention has eliminated the disadvantage of the character described.

A primary object of this invention is to provide a cupric sulfate cell adapted for long-time discharge.

Another object of this invention is to provide a cupric sulfate cell that can be manufactured with ease and at low cost.

This invention will be more readily understood by the following specification with reference to the accompanying drawings in which.

Figure 3:
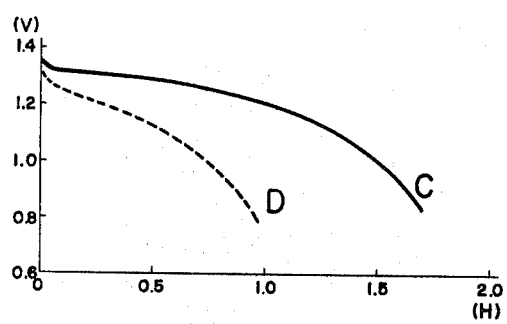
Figure 4:
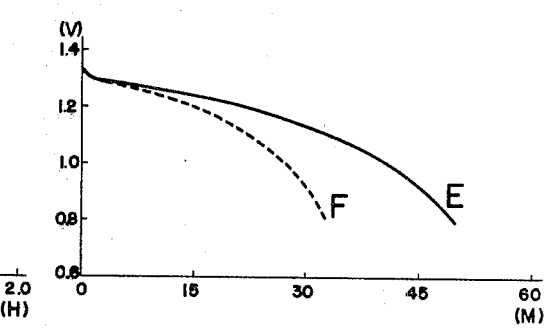

FIG. 3 illustrates discharge curves comparing a modification of the cupric sulfate cell of the invention and the cupric sulfate cell of a conventional type, with discharge time (hour) shown on the abscissa and terminal voltage (volt) shown on the ordinate; and FIG. 4 illustrates discharge curves comparing another modification of the cupric sulfate cell of this invention and the cupric sulfate cell of a conventional type, with discharge time (minute) shown on the abscissa and terminal voltage (volt) shown on the ordinate.

Referring now to the drawings, the numeral 1 designates a current collecting plate such as a copper, a brass or a carbon plate. The current collecting plate is covered with a packaging material 3 that is finely textured and is almost translucent, such as cellophane, filter paper, ion-exchange resin film, kraft paper, parchment paper, regenerated cellulose film, and integrally pressed with a cake of active mixture 2 into contact with the current collecting plate. Plate 1 is connected to a terminal by means of a lead wire 4.

A packaging material such as cellophane, filter paper, ion-exchange resin film, kraft paper, parchment paper, regenerated cellulose film should preferably be (1) low in price, (2) readily pass ion in a neutral electrolyte but not pass powder, (3) readily bent without being torn or cracked, (4) easy to handle, and (5) thin. One of the above packaging materials, or two of them in combination, are used. In order to obtain the maximum efficiency, combinations to be made vary depending upon the discharge conditions of the battery in such a manner that, when for example a discharge current density is on the order of 5 ma./cm.$^2$, both cellophane and kraft paper are used, and when it is on the order of 10 ma./cm.$^2$, kraft paper alone is used. But of these packaging materials, the kraft paper and cellophane in particular are fit for the above requirements, since they are easy to obtain and are so desirable.

The numeral 5 indicates spacers forming a separated layer, said spacers each being made of insulating material such as synthetic resin of a square pillar, a round pillar or a spherical shape and being inserted between the positive and negative electrodes.

The numeral 6 designates an anode plate in which magnesium, zinc, or their alloys are used and which is connected to a terminal by means of a lead wire 7. The numeral 8 indicates a liquid layer space which is defined by the spacers 5 but which can be formed into a liquid layer, if necessary, by use of an absorbent material capable of holding a liquid, such as absorbent cotton without using the spacers 5. The space 8 is filled with an electrolyte during discharge and is adapted to carry out discharge smoothly. The positive and negative electrodes may be tightly bound with yarn, if necessary, or unbound. Alternatively, a hard plate of polyvinyl chloride, having for example a thickness of 3 mm., may be put on the outside of the positive and negative electrodes and then may be tightly bound. The numeral 9 indicates a container having a liquid inlet 10 and made of insulating material such as synthetic resin, ebonite, paper or similar materials.

Next, a cake of active mixture 2 is made by adding a synthetic resin to powered cupric sulfate itself, or its mixture with an electroconductive material such as graphite, acetylene black, powdered copper, and then molding the powdered cupric sulfate thus treated into a cake. This binds the fine particles of synthettic resin to one another and prevents the cake from disintegrating and shrinking so that internal resistance created during discharging can be controlled to the smallest degree. The synthetic resin itself is not dissolved in water, has no effect on the discharge reactions, and accordingly it has a distinctive advantage as a binding agent of a cake of this kind. The following description provides examples of the invention.

EXAMPLE 1

Commercially obtainable cupric sulfate (CuSO$_4$.5H$_2$O) holds hydrate water (5H$_2$O) and is stabilized at normal temperature. Ten gr. of the cupric sulfate is mixed with 3 cc. of an aqueous emulsion of 30% vinyl acetate, and the mixture is poured into a mold of 5 x 5 cm. size and pressed under pressure of 10 kg./cm.$^2$ into a cake of about 3 mm. in thickness. It was confirmed experimentally that the aqueous emulsion displayed particularly good effects when added in a ratio of 2–35% (preferably 8%) to the cake. This cake is placed on a copper plate of the same area, enclosed on its circumference with kraft paper of 0.07 mm. in thickness and cellophane of 0.03 mm. in thickness, and a magnesium plate of about 0.5 mm. in thickness is disposed through 2 x 2 mm. square spacers on the side of the cake. The whole assemblage is bound with yarn to produce a unit cell. The cell of this invention is designated by A.

Figure 1:
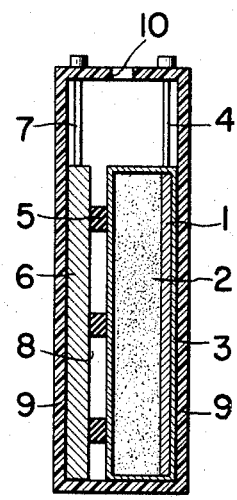
FIG. 1 is a longitudinal sectional view of the cupric cell according to this invention.
Figure 2:
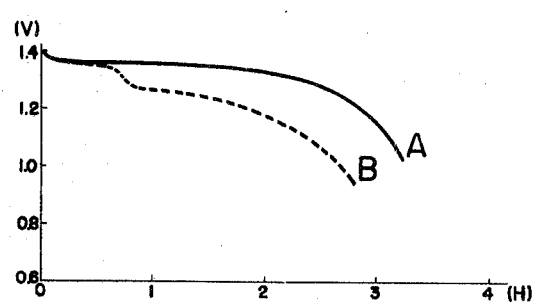
FIG. 2 is a discharge curve shown by comparison between the cupric sulfate cell of the invention and that of a conventional type, with discharge time (hour) shown on the abscissa and terminal voltage (volt) shown on the ordinate.

Next, for comparison's sake, 10 gr. of the same powdered cupric sulfate as used in the cell A is mixed with 2 cc. of water, pressure-molded into a cake, and is assembled with a magnesium plate into a unit cell in the same manner as the cell A. This conventional type cell is designated by B. FIG. 2 shows the results obtained from an experiment with these two cells that are discharged at a current density of 5 ma./cm.$^2$ with a 3% salt solution used as an electrolyte. In FIG. 2, the ordinate indicated terminal voltage (volt) and the abscissa indicates discharge time (hour). The cell A of the invention shows a higher voltage value and a more level discharge curve than the conventional type cell B because the cell A is fortified with synthetic resin.

EXAMPLE 2

Three gr. of graphite to be used as an electroconductive material is mixed with 10 gr. of commercially obtainable cupric sulfate and 4 cc. of aqueous emulsion of 30% of polystyrene is added to the mixture. The mixture thus obtained is poured into a mold of 5 x 5 cm.$^2$ size, pressed under pressure of 10 kg./cm.$^2$ into a cake of about 4 mm. in thickness. The cake is placed on a copper plate of the same area, enclosed on its circumference with kraft paper of 0.07 mm. in thickness, and a magnesium plate of about 0.5 mm. in thickness is disposed through 2 x 2 mm. square spacers on the side of the cake, and then bound with yarn to form a unit cell. This cell of the invention is designated by C.

Next, 3 gr. of graphite to be used as an electroconductive material is mixed with 10 gr. of the same powdered cupric sulfate, and 3 cc. of water is added to the mixture. The mixture thus obtained is pressure-molded in the same manner as the cell C and assembled with a magnesium plate into a unit cell. This conventional type cell is designated by D. FIG. 3 shows the results obtained from an experiment with these two cells that are discharged at a current density of 10 ma./cm.$^2$ with a 3% salt solution used as an electrolyte. In FIG. 3, the ordinate indicates terminal voltage (volt) and the abscissa indicates discharge time (hour).

The cell of this invention shows, in the same manner as the cell A in Example 1, a higher voltage value and a more level discharge curve than the conventional type cell D because of the reduction in internal resistance brought about by strong coagulation and addition of graphite.

EXAMPLE 3

Acetylene black is used as an electroconductive material instead of graphite. Two parts of the acetylene black is mixed with ten parts of commercially obtainable powdered cupric sulfate and four parts of aqueous emulsion of 30% of methacrylic acid is added to the mixture. Fifteen gr. of the mixture thus prepared is poured into a mold of 5 x 5 cm.$^2$ size and pressed under pressure of 10 kg./cm.$^2$ into a cake of about 4 mm. in thickness. This cake is placed on a copper plate of the same area, enclosed with kraft paper 0.05 mm. thick, and a magnesium plate of about 0.5 mm. thick is disposed and bound with yarn to form a unit cell. The cell of this invention is designated by E.

Next, for comparison's sake, two parts of acetylene black is mixed with ten parts of the same powdered cupric sulfate as used in the cell E, and four parts of water is added to the mixture. Fifteen gr. of the mixture thus prepared is pressure-molded in the same manner as the cell E, enclosed with kraft paper, and assembled with spacers and a magnesium plate into a unit cell. This conventional type cell is designated by F.

FIG. 4 indicates the results obtained from an experiment with these two cells which are discharged at a current density of 20 ma./cm.$^2$ with a 30% salt solution used as an electrolyte. In FIG. 4, the ordinate indicates terminal voltage (volt) and the abscissa indicates discharge time (minute).

The cell E of this invention indicates a higher voltage value and a more level discharge curve than the conventional type cell F used for comparison because the cell E coagulates tenaciously and the reduction in internal resistance brought about by the addition of acetylene black is maintained during a period of discharge time in the same manner as the cell A in Example 1 and the cell C in Example 2.

In addition, the same performance as shown in the above examples is also obtained from an experiment made with the cell in which powdered metals that do not chemically react with cupric sulfate, such as powdered copper, are added as an electroconductive material and in which the mixtures used in the examples described above are embedded in a felt metal made of a fine metal wire.

As described above, this invention makes it possible to easily produce a water type cupric sulfate cell of excellent performance adapted for long-time discharge by simply adding a solution of synthetic resin such as vinyl acetate, polystyrene, or the like to a cake of active mixture consisting chiefly of cupric sulfate.

Furthermore, when the cakes, pressure-molded as in the case of the cells B, D, and F in Examples 1, 2 and 3, respectively, are impregnated with a solution of synthetic resin, such as a benzol solution of polystyrene which is useful for integrating the cake, by a simple step of applying the solution to the cakes, they also bring about substantially the same effect as the cells A, C, and E. This demonstrates the effectiveness of adding synthetic resins.

Besides the emulsion of the synthetic resins used in the examples described above, the emulsion, powder or solution of organic solvents of other synthetic resins such as other vinyls, other polystyrenes, phenols, polyesters and acryls may be used in like manner. Above all, polystyrenes are effective particularly as a binding agent for powdered cupric sulfate. Furthermore, since synthetic resins are small in volume in their coagulated form, the molded cake is substantially the same in bulk as when it is free from the added resins. Accordingly, a cell having a synthetic resin added thereto is more effective for improving volumetric efficiency.

Besides water and sea water, neutral solutions, e.g., aqueous solutions of alkali salts such as sodium chloride, sodium sulfate, potassium nitrate, and of alkali earth salts such as calcium chloride, and of aluminium salt or ammonium salt may be also used as an electrolyte. But there is a voltage of about 0.1 volt per unit cell depending upon the concentration and kind of neutral salt solution. But a sodium chloride solution is most desirable of these neutral salt solutions. It is known that a cake of active mixture prepared by mixing sulfur with cuprous chloride becomes about 0.2 volt higher in voltage value per unit cell than that made of cuprous chloride alone. The inventor has also confirmed through experiments that a similar effect was brought about in this invention, namely the voltage value was raised about 0.1 volt per unit cell. But the addition of sulfur leads to generation of hydrogen sulfide in the middle and final stages of discharge and accordingly, consideration must be taken of its effects on the instrument with which the battery is used, when sulfur is mixed. The actions and effects of this invention have been described with reference to a unit cell but it is to be noted that series or parallel connections of more than two unit cells can be readily carried out.

It is to be understood that various modifications of this invention may be made without departing from the scope and spirit of the invention.

What is claimed is:

1. A deferred action battery comprising; a cathode including a molded cake used as an cathodic oxidizing agent, said cake comprising an active mixture of powdered cupric sulfate bound together with synthetic resin, an anode consisting of an anodic reducing agent selected from the group consisting of magnesium, zinc and their alloys, and aqueous neutral salt solutions used as an electrolyte.

2. A deferred action battery according to claim 1 wherein the cake of active mixture is also a current collecting plate and is integrally covered with a packaging material.

References Cited

UNITED STATES PATENTS

| | | | |
|---|---|---|---|
| 3,132,054 | 5/1964 | Carson | 136—120 |
| 3,309,230 | 3/1967 | Almerini et al. | 136—90 |

WINSTON A. DOUGLAS, Primary Examiner

C. F. LE FEVOUR, Assistant Examiner

U.S. Cl. X.R.

136—90